Patented Feb. 27, 1945

2,370,244

UNITED STATES PATENT OFFICE 2,370,244

MATERIALS IMPERMEABLE TO ULTRA-VIOLET RADIATIONS

Donald H. Jacobs, Plainfield, N. J., assignor to Celanese Corporation of America, a corporation of Delaware No Drawing. Application January 28, 1942, Serial No. 428,578

12 Claims. (Cl. 88—109)

This invention relates to the manufacture of materials which are opaque or substantially opaque to ultra-violet light radiations, i. e. radiations from 4,000 A. U. (Angstrom units) to at least 2,700 A. U., or shorter.

Films, foils, sheets and similar materials which are opaque to ultra-violet light radiations are of value for many purposes, such as photographic filters and films, as coverings for food, especially those containing oxidizable fats, as protection for printed matter to preserve the life of the document, as interlayers for laminated or coated glass, as gas mask lenses and welder's goggles, and in fact wherever ultra-violet light absorbers are needed.

Ultra-violet light radiations, even in the amount present in normal sun light, is injurious to the eye, and Government specifications thus require goggle lenses for welders, tank corps, aviation, mechanized troops, etc., to be fabricated of a material impermeable to these short wave lengths or actinic rays. These actinic rays also hasten to turn rancid foodstuffs containing fats and oils and, therefore, wrappers and/or covers for same should absorb these radiations. Actinic rays also effect the fading of merchandise displayed in store windows unless protected therefrom by an ultra-violet light absorbing film or coating on the glass window or by suitably covering the merchandise. Obviously, there are many other uses for ultra-violet light absorbers such as in photography, laminated glass for trucks, airplanes and mechanized equipment, especially those intended for operation in the Tropics where the ultra-violet portion of the sun's rays effect a discoloration and break-down of plastic materials employed in building shatter-proof glass, unbreakable windows, sun shades, visors, gas masks, etc.

Various dyestuffs, when used in sufficient concentration, absorb ultra-violet light radiations satisfactorily. However, they also affect the transmission of the visible part of the spectrum by virtue of the fact that they strongly color the plastic base material to which they are added. Accordingly, such materials are generally objectionable. The ideal ultra-violet light absorber should transmit substantially 100% at wave lengths from 7,200 A. U. to 4,000 A. U. and should transmit substantially no wave lengths from 4,000 A. U. to at least 2,700 A. U. (below which most plastics normally absorb). This property is possessed by plastics produced in accordance with this invention, especially those formed from organic esters of cellulose containing certain cinchona or cinchona-like compounds, such as the acid salts of quinine, quinidine, cinchonine and cinchonidine. Another important property possessed by ultra-violet light absorbers produced in accordance with this invention is their ability to withstand exposure to light and heat without an appreciable change in their transmission characteristics in either the visible part of the spectrum or in the ultra-violet part. In other words, the ultra-violet light absorbers of this invention do not discolor nor do they lose their ultra-violet light absorbing properties upon exposure to light. Moreover, when plasticizers such as those referred to in U. S. Patent No. 1,931,518 to J. F. Walsh, that possess good ultra-violet light transmission effects are employed, these effects may be partially or completely nullified by the addition of the acid salts of quinine bases.

The sheets, films, foils, filaments and other articles of the present invention are formed of plastic base materials which are not in themselves opaque to ultra-violet radiation, especially the near ultra-violet light radiations (4,000 to 2,700 A. U.) but which are made opaque or substantially opaque thereto by incorporating therein or thereon acid salts of quinine, quinidine, cinchonine, cinchonidine and similar compounds. Examples of these salts are quinine bisulfate ($C_{20}H_{24}O_2N_2.H_2SO_4.7H_2O$), quinidine bisulfate, cinchonine bisulfate, cinchonidine bisulfate, quinine or cinchonine dihydrochloride, quinine or cinchonine and urea hydrochloride, etc. These salts need not be chemically pure but may be mixtures of quinine and quinine-like salts, or the acid salts of the extract of Cinchona or Peruvian bark that also contains other closely related compounds. The quinine or similar compound may be derived from Peruvian bark or produced synthetically. Any acid salt of such quinine type bases that shows an acid reaction to litmus and exhibits a bluish fluorescence in an aqueous solution may be employed. For the purpose of describing this invention and in the appended claims, the term "acid salts of quinine bases" or the term "an acid salt of a quinine base" is intended to include any or all of the above described salts.

The amount of acid salt of a quinine base employed will depend upon the plastic base employed, its thickness, its ingredients, i. e. dyes, plasticizers, fillers, etc., and also to the degree of impermeability to ultra-violet light desired. Generally, the amount may vary between 0.1 to 5%, based on the weight of the plastic base. For instance, in a clear cellulose acetate film one part by weight of the bisulfate salt of quinine to 100 parts by weight of cellulose acetate produces stock that in sheets of .040" thick, such as used for goggle lenses, transmits above 90% of the visible spectrum and absorbs more than 95% of the ultra-violet radiations, especially those having a length of 3,650 A. U.

As stated above, any acid salt of a quinine base may be incorporated in the plastic sheet, film, foil, filament or lacquer in amounts of from 0.1 to 5% or more, based on the weight of the plastic base. The salt may be incorporated in the plastic film or foil by adding it to the solution of plastic material and solvent therefor, with or without plasticizers for the plastic material, from which the film or foil is formed. The salt may be applied as a coating to a preformed film, foil or any preformed article having a plastic base by subbing, brushing or spraying the preformed base with a solution of the salt with or without a carrier therefor. The salt may be incorporated in press mass powder and extruded or pressure molded into articles, in which case the salt aids in stabilizing the dyes while they are under the high temperature and/or pressure of molding and subsequent exposure to actinic rays. It is preferable to add the salt dissolved in a volatile solvent to the dope from which the plastic articles are made. Alcohol is a good solvent for most of the acid salts of quinine. The acid salts can also be incorporated in the plastic base material by dissolving or suspending it in a plasticizer and the product used for laminating two films together or laminating a film to one or more sheets of glass. The salts may be incorporated in lacquers containing a plastic film base which lacquers are useful for coating articles such as window glass, bottles, etc. Plastic sheets, films, fabrics or foils containing the acid salts may be employed as an overlay for protecting light sensitive bases, such as cellulose nitrate and certain resins, to prevent the same from darkening or "crazing" upon exposure to sunlight.

The plastic base is preferably a derivative of cellulose, such as cellulose esters and ethers, but it may also be any other suittable plastic or mixture of plastics. The examples of cellulose derivatives are nitrocellulose, cellulose acetate, cellulose aceto-butyrate, cellulose acetate-phthalate, cellulose propionate, methyl cellulose, ethyl cellulose, benzyl cellulose, etc. The base may also be regenerated or reconstituted cellulose or a synthetic resin such as polystyrene, polymerized methyl methacrylate, vinyl or vinal resins, phenol or urea formaldehyde condensation products, such as Bakelite, Catalin, Beetleware, synthetic rubbers such as Pliofilm, etc. Artificial silk fabrics may be made exhibiting a marked opacity to ultra-violet light. Gelatin and agar may also be employed as the base. In some instances the effect of adding an acid salt of a quinine base to the base comprising a light sensitive resin would produce an ultra-violet light filter that would prevent discoloration and break-down or "crazing" of the light sensitive base. Light sensitive liquids or solids are also rendered more stable by the addition thereto of small amounts of acid salts of a quinine base.

An important advantage of this invention is that it is necessary to employ only a relatively small amount of the acid salt of a quinine base to obtain the effect desired. The small amounts employed do not interact with the dyestuffs which are generally added to films, foils or molded articles to control the transmission characteristics of the visible portion of the spectrum, such as the dyes used to balance the natural yellow or brown cast of plastics, the grey dye used in welders' goggles, etc. Furthermore, when the acid salt of a quinine base is incorporated or dissolved in the plastic it does not cause objectionable scattering or refraction of light to produce a haze or cloudiness. This clarity coupled with ultra-violet light opacity is a highly desirable feature.

It is to be understood that the foregoing detailed description is merely given by way of illustration and that many variations may be made therein without departing from the spirit of my invention.

Having described my invention, what I desire to secure by Letters Patent is:

1. Films, foils, sheets and other articles characterized by being substantially opaque to ultra-violet light radiations, said articles comprising an organic acid ester of cellulose base material having incorporated therewith a colorless acid salt of a quinine base.

2. Films, foils, sheets and other articles characterized by being substantially opaque to ultra-violet light radiations, said articles comprising a cellulose acetate base material having incorporated therewith a colorless acid salt of a quinine base.

3. Films, foils, sheets and other articles characterized by being substantially opaque to ultra-violet light radiations, said articles comprising an organic acid ester of cellulose base material having incorporated therewith a colorless acid salt of quinine, the aqueous solution of which salt shows an acid reaction to litmus and exhibits a blue fluorescence.

4. Films, foils, sheets and other articles characterized by being substantially opaque to ultra-violet light radiations, said articles comprising a cellulose acetate base material having incorporated therewith a colorless acid salt of quinine, the aqueous solution of which salt shows an acid reaction to litmus and exhibits a blue fluorescence.

5. A film- or foil-forming compound which produces films or foils that are substantially opaque to ultra-violet radiations and substantially transparent to visible radiations, said compound containing an organic acid ester of cellulose and a colorless acid salt of quinine base.

6. A film- or foil-forming compound which produces films or foils that are substantially opaque to ultra-violet radiations and substantially transparent to visible radiations, said compound containing an organic acid ester of cellulose and 0.1 to 5%, based on the weight of the cellulose ester, of a colorless acid salt of quinine base.

7. A film- or foil-forming compound which produces films or foils that are substantially opaque to ultra-violet radiations and substantially transparent to visible radiations, said compound containing cellulose acetate and 0.1 to 5%, based on the weight of the cellulose acetate, of a colorless acid salt of quinine base.

8. Films, foils, sheets and other articles that are substantially opaque to light radiations having a wave length shorter than 4,000 A. U. comprising an organic acid ester of cellulose and a colorless salt of a quinine base that in aqueous solution shows an acid reaction to litmus and exhibits a bluish fluorescence.

9. Films, foils, sheets and other articles that are substantially opaque to light radiations having a wave length shorter than 4,000 A. U. comprising cellulose acetate and a colorless salt of a quinine base that in aqueous solution shows an acid reaction to litmus and exhibits a bluish fluorescence.

10. An article containing an organic acid ester of cellulose and from 0.1 to 5%, based on the weight of the organic acid ester of cellulose, of a colorless acid salt of a quinine base, an 0.04" thickness of said article transmitting more than 95% of the visible spectrum and absorbing more than 95% of the ultra-violet waves having a length of 3,650 A. U.

11. An article containing cellulose acetate and from 0.1 to 5%, based on the weight of the cellulose acetate, of a colorless acid salt of a quinine base, an 0.04" thickness of said article transmitting more than 95% of the visible spectrum and absorbing more than 95% of the ultra-violet waves having a length of 3,650 A. U.

12. An article containing cellulose acetate and from 0.1 to 5%, based on the weight of the cellulose acetate, of quinine bisulfate, an 0.04" thickness of said article transmitting more than 95% of the visible spectrum and absorbing more than 95% of the ultra-violet waves having a length of 3,650 A. U.

DONALD H. JACOBS.